US 7,779,009 B2

(12) United States Patent
Chowdhury et al.

(10) Patent No.: US 7,779,009 B2
(45) Date of Patent: Aug. 17, 2010

(54) WEB QUERY CLASSIFICATION

(75) Inventors: Abdur R. Chowdhury, Oakton, VA (US); Steven Michael Beitzel, Chicago, IL (US); David Dolan Lewis, Chicago, IL (US); Aleksander Kolcz, Fairfax, VA (US)

(73) Assignee: AOL Inc., Dulles, VA (US)

( * ) Notice: Subject to any disclaimer, the term of this patent is extended or adjusted under 35 U.S.C. 154(b) by 601 days.

(21) Appl. No.: 11/340,843

(22) Filed: Jan. 27, 2006

(65) Prior Publication Data

US 2006/0190439 A1 Aug. 24, 2006

Related U.S. Application Data

(60) Provisional application No. 60/647,424, filed on Jan. 28, 2005.

(51) Int. Cl.
*G06F 17/30* (2006.01)

(52) U.S. Cl. .................................................... 707/737

(58) Field of Classification Search ................ 707/4, 707/3, 1
See application file for complete search history.

(56) References Cited

U.S. PATENT DOCUMENTS

| | | | | |
|---|---|---|---|---|
| 5,867,799 A * | 2/1999 | Lang et al. ...................... 707/1 |
| 6,006,225 A * | 12/1999 | Bowman et al. ................ 707/5 |
| 6,256,664 B1 * | 7/2001 | Donoho et al. .............. 709/204 |
| 6,263,362 B1 * | 7/2001 | Donoho et al. .............. 709/207 |
| 6,356,936 B1 * | 3/2002 | Donoho et al. .............. 709/206 |
| 6,523,029 B1 | 2/2003 | Kulyukin |
| 6,553,347 B1 | 4/2003 | Tavor et al. |
| 6,604,130 B2 * | 8/2003 | Donoho et al. .............. 709/204 |
| 6,675,159 B1 * | 1/2004 | Lin et al. ........................ 707/3 |
| 6,745,161 B1 * | 6/2004 | Arnold et al. ................... 704/7 |
| 6,766,320 B1 * | 7/2004 | Wang et al. ..................... 707/5 |
| 6,778,975 B1 * | 8/2004 | Anick et al. .................... 707/1 |
| 6,801,929 B1 * | 10/2004 | Donoho et al. .............. 709/204 |
| 6,910,003 B1 * | 6/2005 | Arnold et al. ................... 704/4 |
| 6,941,294 B2 * | 9/2005 | Flank ............................. 707/3 |
| 7,007,008 B2 * | 2/2006 | Goel et al. ...................... 707/3 |
| 7,213,027 B1 * | 5/2007 | Kominek et al. ............ 707/102 |
| 7,225,183 B2 * | 5/2007 | Gardner ......................... 707/3 |
| 7,246,150 B1 * | 7/2007 | Donoho et al. .............. 709/204 |

(Continued)

OTHER PUBLICATIONS

HKUST Team, "An Ensemble Search Based Method for Query Classification", Jul. 13, 2005, 5 pages.

(Continued)

*Primary Examiner*—Neveen Abel Jalil
*Assistant Examiner*—Mark Andrew X Radtke
(74) *Attorney, Agent, or Firm*—Finnegan, Henderson, Farabow, Garrett & Dunner, LLP

(57) ABSTRACT

A query phrase may be automatically classified to one or more topics of interest (e.g., categories) to assist in routing the query phrase to one or more appropriate backend databases. A selectional preference query classification technique may be used to classify the query phrase based on a comparison between the query phrase and patterns of query phrases. Additionally, or alternatively, a combination of query classification techniques may be used to classify the query phrase. Topical classification of a query phrase also may be used to assist a search system in delivering auxiliary information to a user who entered the query phrase. Advertisements, for instance, may be tailored based on classification rather than query keywords.

27 Claims, 6 Drawing Sheets

U.S. PATENT DOCUMENTS

| | | | |
|---|---|---|---|
| 7,346,606 B2 * | 3/2008 | Bharat | 707/3 |
| 7,346,655 B2 * | 3/2008 | Donoho et al. | 709/204 |
| 2001/0037328 A1 * | 11/2001 | Pustejovsky et al. | 707/3 |
| 2001/0049679 A1 * | 12/2001 | Yonaitis | 707/4 |
| 2002/0002450 A1 * | 1/2002 | Nunberg et al. | 707/4 |
| 2003/0037050 A1 | 2/2003 | Monteverde | |
| 2003/0041058 A1 * | 2/2003 | Ibuki et al. | 707/4 |
| 2003/0061219 A1 | 3/2003 | Monteverde | |
| 2003/0088465 A1 | 5/2003 | Monteverde | |
| 2003/0088553 A1 | 5/2003 | Monteverde | |
| 2003/0167212 A1 | 9/2003 | Monteverde | |
| 2004/0111678 A1 * | 6/2004 | Hara et al. | 707/3 |
| 2004/0158560 A1 * | 8/2004 | Wen et al. | 707/4 |
| 2004/0199505 A1 * | 10/2004 | Calistri-Yeh et al. | 707/4 |
| 2004/0215515 A1 * | 10/2004 | Perry | 707/104.1 |
| 2004/0249808 A1 * | 12/2004 | Azzam et al. | 707/4 |
| 2004/0260677 A1 * | 12/2004 | Malpani et al. | 707/3 |

OTHER PUBLICATIONS

S. M. Beitzel, E. C. Jensen, O. Frieder , D. Grossman, D. D. Lewis, A. Chowdhury and A. Kolcz, "Automatic Web Query Classification Using Labeled and Unlabeled Training Data", Aug. 15-19, 2005, Salvador, Brazil, pp. 581-582.

R. S. Bot, Y. B. Wu, X. Chen, Q. Li, "Generating Better Concept Hierarchies Using Automatic Document Classification" Oct. 31-Nov. 5, 2005, Bremen, Germany, pp. 281-282.

A. Chowdury and G. Pass, "Operational Requirements for Scalable Search Systems", Nov. 3-8, 2003, New Orleans, LA, pp. 435-442.

F. Das-Neves, E. Fox, X. Yu, "Connecting Topics in Document Collections with Stepping Stones and Pathways", Oct. 31-Nov. 5, 2005, Bremen, Germany, pp. 91-98.

E. J. Glover, S. Lawrence, W. P. Birmingham and C. L. Giles, "Architecture of a Metasearch Engine that Supports User Information Needs", Nov. 1999, Kansas City, MO, p. 210-216.

D. Grossman and O. Frieder, Information Retrieval Algorithms and Heuristics, Aug. 2004, 6 pages.

S. Lawrence and C. L. Giles, "Searching the World Wide Web", Science Magazine, vol. 280, Apr. 3, 1998, pp. 98-100.

R. Manmatha, A. Feng and J. Allan, "A Critical Examination of TDT's Cost Function", Aug. 2002, Tampere, Finland, pp. 403-404.

N. Craswell and D. Hawking, "Overview of the TREC-2004 Web Track", Nov. 2004, pp. 1- 9.

N. Craswell, D. Hawking, R. Wilkinson, and M. Wu, "Overview of the TREC 2003 Web Track", Mar. 22, 2004, http//www.es.csiro.au/TRECWeb, pp. 1-15.

L. Gravano, V. Hatzivassiloglou, R. Lichtenstein, "Categorizing Web Queries According to Geographical Locality", Nov. 3-8, 2003, New Orleans, Louisiana, pp. 325-333.

L. L. Kupper and K. B. Hafner, Teacher's Corner, "How Appropriate Are Popular Sample Size Formulas?", The American Statistician, May 1989, vol. 43, No. 2, pp. 101-105.

P. S. Resnik, "Selection and Information: A Class-Based Approach to Lexical Relationships", Ph. D. Disseration, University of Pennsylvania, Dec. 1993, 173 pages.

P. Resnik, "Selectional Preference and Sense Disambiguation", Proceedings of ACL Siglex Workshop on Tagging Text with Lexical Semantics, Why, What and How?, Washington, Apr. 4-5, 1997, pp. 52-57.

F. Sebastiani, "Machine Learning in Automated Text Categorization", Italy, ACM Computing Surveys, vol. 34, No. 1, Mar. 2002, pp. 1-47.

A. Spink, B. J. Jansen, D. Wolfram, T. Saracevic, "From E-Sex to E-Commerce: Web Search Changes" IEEE Computer 35(3), Mar. 2002, pp. 107-109.

J. Wen, J. Nie and H. Zhang, "Query Clustering Using User Logs", ACM Transactions on Information Systems, vol. 20, No. 1, Jan. 2002, pp. 59-81.

Search Engine Watch, 2 pages, Dec. 13, 2005, cited at http://searchenginewatch.com/reports/print.php/34701_2156461.

Classification and Taxonomy Tools—SearchTools.com Listing "Tools for Taxonomies, Browsable Directories, and Classifying Documents into Categories", 9 pages, Nov. 22, 2005, cited at http://www.searchtools.com/info/classifiers-tools.html.

O. Alonso, Improving Intranet Search with Database-Backed Technology, 4 pages, Nov. 22, 2005, cited at http://www.oracle.com/technology/products/text/files/0W03SF_OA.ppt.

Office of Fair Trading, Advanced Search, 2 pages, Nov. 22, 2005, cited at http://www.oft.gov.uk/Advanced+Search.

Social Patters Michael Nguyen on Search Engine Marketing, Google Patent: Personalization of Placed Content Ordering in Search Results, 9 pages, Nov. 4, 2005, cited at http://www.socialpatters.com/search-engine-maketing/google-patent-personalization-of-placed-content-o.....

Comparison Engines Holiday Shopping at Yahoo! Shopping, 4 pages, Oct. 30, 2005, cited at http://www.comparisonengines.com/?p=182.

I. Spasic, S. Anaiadou, "Using automatically learnt verb selectional preferences for classification of biomedical terms", printed in the Journal of Biomedical Informatics 37, Sep. 25, 2004, pp. 483-497.

HKUST Team, "An Ensemble Search Based Method for Query Classification", Jul. 13, 2005, 5 pages.

S. M. Beitzel, E. C. Jensen, O. Frieder , D. Grossman, D. D. Lewis, A. Chowdhury and A. Kolcz, "Automatic Web Query Classification Using Labeled and Unlabeled Training Data", Aug. 15-19, 2005, Salvador, Brazil, pp. 581-582.

S. M. Beitzel, E. C. Jensen, O. Frieder , D. Grossman, D. D. Lewis, A. Chowdhury and A. Kolcz, "Improving Automatic Query Classification via Semi-supervised Learning", Proceedings of the Fifth IEEE International Conference on Data Mining, Nov. 2005, 8 pages.

R. S. Bot, Y. B. Wu, X. Chen, Q. Li, "Generating Better Concept Hierarchies Using Automatic Document Classification" Oct. 31-Nov. 5, 2005, Bremen, Germany, pp. 281-282.

J. Cho, H. Garcia-Molina, and L. Page, "Efficient Crawling Through URL Ordering" Department of Computer Science, Stanford, CA, Apr. 1998, 18 pages.

A. Chowdury and G. Pass, "Operational Requirements for Scalable Search Systems", Nov. 3-8, 2003, New Orleans, LA, pp. 435-442.

F. Das-Neves, E. Fox, X. Yu, "Connecting Topics in Document Collections with Stepping Stones and Pathways", Oct. 31-Nov. 5, 2005, Bremen, Germany, pp. 91-98.

E. J. Glover, S. Lawrence, W. P. Birmingham and C. L. Giles, "Architecture of a Metasearch Engine that Supports User Information Needs", Nov. 1999, Kansas City, MO, p. 210-216.

D. Grossman and O. Frieder, Information Retrieval Algorithms and Heuristics, Aug. 2004, 6 pages.

W. Knuth and M. Mezard, "Learning Algorithms with Optimal Stability in Neural Networks", IOP Publishing, May 1987, printed in the United Kingdom, pp. 745-752.

S. Lawrence and C. L. Giles, "Searching the World Wide Web", Science Magazine, vol. 280, Apr. 3, 1998, pp. 98-100.

D. D. Lewis, "Evaluating and Optimizing Autonomous Text Classification Systems", 1995, Seattle WA, Jul. 1995, pp. 246-254.

R. Manmatha, A. Feng and J. Allan, "A Critical Examination of TDT's Cost Function", Aug. 2002, Tampere, Finland, pp. 403-404.

D. McCarthy and J. Carroll, "Disambiguating Nouns, Verbs, and Adjectives Using Automatically Acquired Selectional Preferences", Computational Linguistics, vol. 29, No. 4, Dec. 2003, pp. 639-654.

A. Ntoulas, J. Cho and C. Olston, "What's New on the Web? The Evolution of the Web from a Search Engine Perspective", ACM, May 2004, pp. 1-12.

P. Kawalczyk, I. Zukerman, and M. Niemann, "Analyzing the Effect of Query Class on Document Retrieval Performance", Australian Conference on Artificial Intelligence, Dec. 2004, pp. 1-12.

D. Beeferman and A. Berger, "Agglomerative Clustering of a Search Engine Query Log", Aug. 2000, Boston, MA, pp. 407-416.

S. M. Beitzel, E.C. Jensen, A. Chowdhury, D. Grossman, O. Frieder, "Hourly Analysis of a Very Large Topically Categorized Web Query Log", Jul. 2004, Sheffield, South Yorkshire, United Kingdom, pp. 321-328.

A. Broder, "A Taxonomy of Web Search", SIGIR Forum, Fall Sep. 2002, vol. 36, No. 2, pp. 3-10.

N. Craswell and D. Hawking, "Overview of the TREC-2004 Web Track", Nov. 2004, pp. 1-9.

N. Craswell, D. Hawking, R. Wilkinson, and M. Wu, "Overview of the TREC 2003 Web Track", Mar. 22, 2004, http//www.es.csiro.au/TRECWeb, pp. 1-15.

E. J. Glover, S. Lawrence, W. P. Birmingham and C. L. Giles, "Architecture of a Metasearch Engine that Supports User Information Needs", Nov. 1999, Kansas City, MO, pp. 210-216.

L. Gravano, V. Hatzivassiloglou, R. Lichtenstein, "Categorizing Web Queries According to Geographical Locality", Nov. 3-8, 2003, New Orleans, Louisiana, pp. 325-333.

B. J. Jansen, A. Spink, T. Saracevic, "Real Life, Real Users, and Real Needs: A Study and Analysis of User Queries on the Web", Information Processing and Management 36, Mar. 2000, pp. 207-227.

I. Kang, G. Kim, "Query Type Classification for Web Document Retrieval", SIGIR Jul. 2003, Toronto Canada, pp. 64-71.

L. L. Kupper and K. B. Hafner, Teacher's Corner, "How Appropriate Are Popular Sample Size Formulas?", The American Statistician, May 1989, vol. 43, No. 2, pp. 101-105.

M. Light and W. Greiff, Statistical Models for the Induction and Use of Selectional Preferences, 2002, http://www.elsevier.com/locate.cogsci, Cognitive Science 26, Mar. 2002, pp. 269-281.

A. Martin, G. Doddington, T. Kamm, M. Ordowski and M. Przybocki, "The DET Curve in Assessment of Detection Task Performance", Proceedings of Eurospeech 97, Sep. 1997, 4 pages.

H. Pu, S. Chuang, and C. Yang, "Subject Categorization of Query Terms for Exploring Web Users' Search Interests", Journal of the American Society for Information Science and Technology, 53(8), Jun. 2002, pp. 617-630.

P. S. Resnik, "Selection and Information: A Class-Based Approach to Lexical Relationships", Ph. D. Disseration, University of Pennsylvania, Dec. 1993, 173 pages.

P. Resnik, "Selectional Preference and Sense Disambiguation", Proceedings of ACL Siglex Workshop on Tagging Text with Lexical Semantics, Why, What and How?, Washington, Apr. 4-5, 1997, pp. 52-57.

G. Salton, A. Wong, C. S. Yang, "A Vector Space Model for Automatic Indexing", Communications of the ACM, Nov. 1975, vol. 18, No. 11, pp. 613-620.

F. Sebastiani, "Machine Learning in Automated Text Categorization", Italy, ACM Computing Surveys, vol. 34, No. 1, Mar. 2002, pp. 1-47.

A. Spink, B. J. Jansen, D. Wolfram, T. Saracevic, "From E-Sex to E-Commerce: Web Search Changes" IEEE Computer 35(3), Mar. 2002, pp. 107-109.

A. Spink, S. Ozmutlu, H. C. Ozmutlu and B. J. Jansen, "U.S. Versus European Web Searching Trends", SIGIR Forum, Sep. 2002, vol. 36, No. 2, pp. 32-38.

A. Spink, D. Wolfram, B. J. Jansen, and T. Saracevic, "Searching the Web: The Public and Their Queries", Journal of American Society for Information Science and Technology, 52(3), Feb. 2001, pp. 226-234.

J. Tague, "The Pragmatics of Information Retrieval Experimentation", in "Informational Retrieval Experiment", K. S. Jones ed., Dec. 1981, pp. 57-102.

E. M.Voorhees, "Overview of the TREC 2004 Question Answering Track" TREC-2004, Nov. 2004, Gaithersburg, MD , 10 pages.

J. Wen, J. Nie, H. Zhang, "Clustering User Queries of a Search Engine", May 2001, Hong Kong, pp. 162-168.

J. Wen, J. Nie, H. Zhang, "Query Clustering Using Content Words and User Feedback", Sep. 2001, New Orleans, Louisiana, pp. 442-443.

J. Wen, J. Nie and H. Zhang, "Query Clustering Using User Logs", ACM Transactions on Information Systems, vol. 20, No. 1, Jan. 2002, pp. 59-81.

Search Engine Watch, 2 pages, Dec. 13, 2005, cited at http://searchenginewatch.com/reports/print.php/34701_2156461.

Classification and Taxonomy Tools—SearchTools.com Listing "Tools for Taxonomies, Browsable Directories, and Classifying Documents into Categories", 9 pages, Nov. 22, 2005, cited at http://www.searchtools.com/info/classifiers-tools.html.

O. Alonso, Improving Intranet Search with Database-Backed Technology, 4 pages, Nov. 22, 2005, cited at http://www.oracle.com/technology/products/text/files/0W03SF_OA.ppt.

Office of Fair Trading, Advanced Search, 2 pages, Nov. 22, 2005, cited at http://www.oft.gov.uk/Advanced+Search.

Social Patters Michael Nguyen on Search Engine Marketing, Google Patent: Personalization of Placed Content Ordering in Search Results, 9 pages, Nov. 4, 2005, cited at http://www.socialpatters.com/search-engine-maketing/google-patent-personalization-of-placed-content-o.....

Comparison Engines Holiday Shopping at Yahoo! Shopping, 4 pages, Oct. 30, 2005, cited at http://www.comparisonengines.com/?p=182.

C. Chekuri, M H. Goldwasser, P. Raghavan, and E. Upfal, "Web Search Using Automatic Classification", 10 pages, Proceedings of the WWW-96, Dec. 1996, cited at http://www.theory.stanford.edu/people/wass/publications/Web_Search/Web_Search.html.

* cited by examiner

WEB QUERY CLASSIFICATION

CROSS REFERENCE TO RELATED APPLICATIONS

This application claims the benefit of U.S. Provisional Application No. 60/647,424, filed Jan. 28, 2005, and titled WEB QUERY CLASSIFICATION, which is incorporated by reference in its entirety.

TECHNICAL FIELD

This description relates to classifying search queries.

BACKGROUND

A query phrase may be classified into a particular category. The query phrase may be classified manually by a human editor or through an automated comparison of the query phrase against a list of query phrases previously classified manually by a human editor. The query phrase also may be classified automatically by a system that has learned, from a training set of classified query phrases, to distinguish characteristics of query phrases in order to classify a particular query phrase.

SUMMARY

In a general aspect, satisfaction of a search responsive to a query is enabled based on classification of the query. A query phrase is received from user input. The received query phrase is parsed into constituent parts. A pattern that is associated with at least one category is accessed from classification information stored in a computer storage medium that includes patterns of query phrases. Whether a constituent part parsed from the received query phrase corresponds to at least a subportion of an accessed pattern is determined. Based on a determination that a constituent part parsed from the received query phrase corresponds to at least a subportion of an accessed pattern, the category that is associated with the pattern also is associated with the query phrase or the constituent part. At least one search resource for satisfying the query phrase based on the associated category is identified.

Implementations may include one or more of the following features. For example, routing of the query phrase to the at least one identified search resource may be enabled. Associating the category may include associating the category with the query phrase. Associating the category may include associating the category with the constituent part. More than one category may be associated with the query phrase or the constituent part.

Based on the query phrase, a search result may be received from the at least one identified search resource and presentation of the at least one search result to the user may be enabled.

The category associated with the search query may be compared with attributes associated with the multiple search resources, such that routing the query phrase to at least one search resource may include modifying the query phrase and routing a modified version of the query phrase to a subset of multiple search resources based on results of the comparison. Modifying the query phrase may include adding words to the query phrase, eliminating words from the query phrase, and/or re-ordering words in the query phrase.

An advertisement associated with at least one of the categories associated with the query phrase may be determined and presentation of the advertisement to the user may be enabled.

A selectional preference query classification technique may be trained. The training may include receiving a training query phrase including constituent parts, parsing the training query phrase into at least one constituent part, receiving additional training query phrases having at least one constituent part in common with the training query phrase, recognizing a pattern of training query phrases having at least one common constituent part, determining a category associated with the at least one common constituent part, associating the pattern of training query phrases with the category associated with the at least one common constituent part, and using the pattern to categorize query phrases. A constituent part may include an individual word, a subportion of the training query phrase, and/or the entire training query phrase.

A query phrase may be classified using a manual query classification technique and/or a supervised machine learning query classification technique. The results of the query classification techniques may be compared and the query phrase may be classified using a classification arbiter if the comparison indicates inconsistent results produced by the query classification techniques. A category for the query phrase may be determined using more than two query classification techniques. The query phrase may be classified using the classification arbiter and based on the classification determined by a majority of the query classification techniques. The classification arbiter may determine the classification of the query phrase based on a confidence in the classification of the query phrase that resulted from using a query classification technique and an overall classification metric of the query classification technique. The query phrase may be classified using the classification arbiter and based on both the classification determined by a majority of the query classification techniques and a determination of the classification based on a confidence in the classification of the query phrase that resulted from using a query classification technique and the overall classification metric of the query classification technique.

The manual query classification technique may be used as the seed for the selectional preference and supervised machine learning query classification techniques.

In another general aspect, a query classification technique is trained. A training query phrase that includes constituent parts is received. The training query phrase is parsed into at least one constituent part. Additional training query phrases having at least one constituent part in common with the training query phrase are received. A pattern of training query phrases having at least one common constituent part is recognized. A category associated with the at least one common constituent part is determined. The pattern of training query phrases is associated with the category associated with the at least one common constituent part. The pattern is stored in a computer readable medium as classification information.

Implementations may include one or more of the features noted above or one or more of the following features. For example, constituent parts may include individual words, smaller phrases within the query phrase, and/or the entire query phrase.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

Like reference symbols in the various drawings indicate like elements.

DETAILED DESCRIPTION

Search engines, both for the Web and for enterprises, may automatically route an incoming query phrase to several specialized backend databases and may merge the search results received from those databases to create a merged listing. To receive meaningful search results, the metasearch system selects a subset of all available backend databases, based, for instance, on the relative appropriateness of each database to the query phrase. Being selective with routing decisions may result in a relatively high ratio of relevant results, which results in more efficient and less costly processing when compared with results that follow from sending every query phrase to every backend database and the relatively low ratio of relevant results following therefrom.

Techniques are described for automatically classifying a query phrase among one or more topics of interest (e.g., categories) and using those topics of interest to assist in routing the query phrase to an appropriate subset of available backend databases. A selectional preference query classification technique may be used to select a subset of backend databases (or other searchable resources or search processes) based on a comparison between a query phrase and patterns of query phrases. Additionally, or alternatively, a combination of query classification techniques may be used to classify a query phrase. Techniques also are described for using topical classification of a query phrase to assist a search system in delivering auxiliary information to a user who entered the query phrase. Advertisements, for instance, may be tailored based on classification rather than query keywords.

Figure 1:
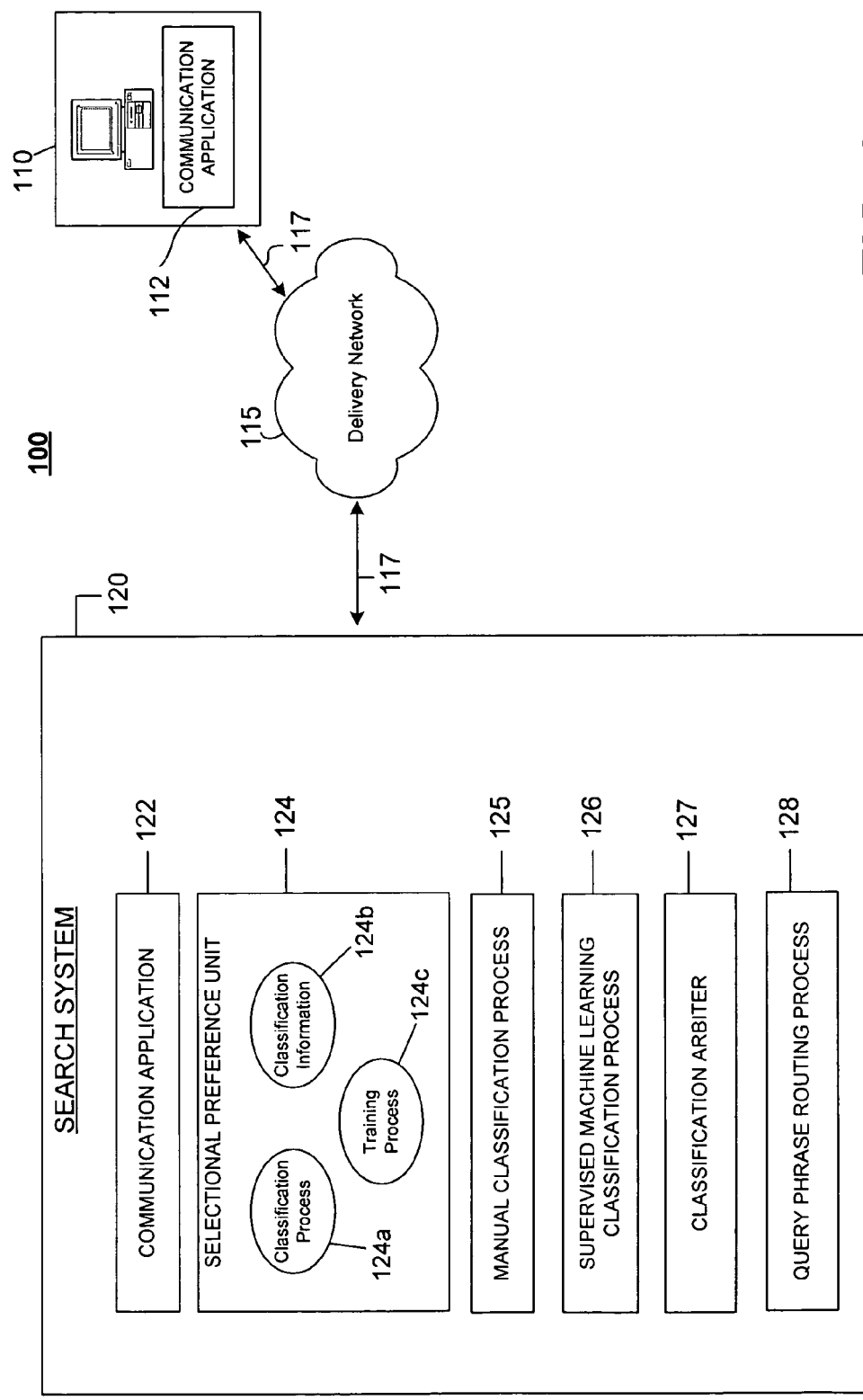
FIG. 1 is a block diagram of a communications system capable of classifying a query phrase and routing the query phrase to a backend database related to the query phrase classification.

Referring to FIG. 1, a communications system 100 is configured to classify a query phrase and, based on the query phrase classification, route the query phrase to a backend database related to the query phrase classification. More particularly, the communications system 100 is configured to deliver and exchange messages between a client system 110 and a search system 120 through a delivery network 115 to classify a user entered query phrase into a topical category and provide search results received from a backend database to which the query phrase is routed and which is related to the query phrase classification.

Each of the client system 110 and the search system 120 may be a general-purpose computer (e.g., a personal computer, a desktop computer, or a laptop computer) configured to respond to and execute instructions in a defined manner. Other examples of the client system 110 and the search system 120 include a special-purpose computer, a workstation, a server, a device, a component, other physical or virtual equipment or some combination thereof capable of responding to and executing instructions. The client system 110 also may be a personal digital assistant (PDA), a communications device, such as a mobile telephone, or a mobile device that is a combination of a PDA and communications device.

The client system 110 also includes a communication application 112 and is configured to use the communication application 112 to establish a communication session with the search system 120 over the delivery network 115. The communication application 112 may be, for example, a browser or another type of communication application that is capable of accessing the search system 120. In another example, the communication application 112 may be a client-side application configured to communicate with the search system 120. The client system 110 is configured to send to the search system 120 requests for search results (e.g., a query phrase entered by a user). The client system 110 also is configured to receive search results from the search system 120 and to present the received search results to the user.

The delivery network 115 provides a direct or indirect communication link between the client system 110 and the search system 120, irrespective of physical separation. Examples of a delivery network 115 include the Internet, the World Wide Web, WANs ("Wide Area Networks"), LANs ("Local Area Networks"), analog or digital wired and wireless telephone networks (e.g., PSTN ("Public Switched Telephone Network"), ISDN ("Integrated Services Digital Network"), and DSL ("Digital Subscriber Line") including various forms of DSL such a SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data.

The delivery network 115 includes communication pathways 117 that enable the client system 110 and the search system 120 to communicate with the delivery network 115. Each of the communication pathways 117 may include, for example, a wired, wireless, virtual, cable or satellite communications pathway.

The search system 120 may receive instructions from, for example, a software application, a program, a piece of code, a device, a computer, a computer system, or a combination thereof, which independently or collectively direct steps, as described herein. The search system 120 includes a communication application 122 that is configured to enable the search system 120 to communicate with the client system 110 through the delivery network 115.

The search system 120 may be a host system, such as an Internet service provider that provides a search service to subscribers. In another example, the search system 120 may be a system that hosts a web site that provides search services to the general public. The search system 120 also may be referred to as a search engine or a search service.

In general, the search system 120 may be configured to classify a user entered query phrase into a topical category and provide search results received from a backend database to which the query phrase is routed and which is related to the query phrase classification.

More particularly, the search system 120 includes selectional preference unit 124 configured to classify a query phrase. Selectional preference unit 124 includes classification process code segment 124a, classification information data store 124b and training process code segment 124c.

Classification process code segment 124a may be configured to receive a query phrase entered by a user at client 110. For example, code segment 124a may receive the query phrase "BMW wheels." Code segment 124a may be further configured to determine and associate a category with the received query phrase. To do so, code segment 124a may access classification information data store 124b.

Classification information data store 124b may be configured to store information related to patterns of query phrases and associated categories. A query phrase may include constituent parts, where a constituent part may be an individual word, a smaller phrase of more than one word within the query phrase or the entire query phrase. Data store 124b may be configured to store a category associated with a particular pattern of query phrases having the same, or similar, constituent parts. In some implementations, data store 124b may be configured to store an association between a category, or some other descriptive or definitional information, and a particular individual constituent part. For example, data store 124b may store a pattern of query phrases that include a particular automobile manufacturer plus the word "wheels." The pattern may be associated with the category "automobile." Furthermore, in some implementations, the constituent part "wheels" also may be associated with the automobile category.

Training process code segment 124c may be configured to detect a pattern of query phrases, associate a detected pattern with a category and store the detected pattern and associated category information in data store 124b, as described in detail below. Code segment 124c may be executed for the purpose of setting up initial classification information to be used by code segment 124a to classify a query phrase. For example, in keeping with the above noted example used with respect to data store 124b, code segment 124c may be executed to detect a pattern of query phrases that include an automobile manufacturer plus the word "wheels" based on a series of query phrases, such as Ford plus wheels or Nissan plus wheels.

In some implementations, code segment 124c may be configured to determine whether a relationship between a detected pattern and a category is strong enough to warrant associating the detected pattern with the category and storing the information in data store 124b for use in categorizing future query phrases. If the strength of the relationship satisfies a threshold, the detected pattern and associated category may be useful in categorizing future query phrases and will be stored in data store 124b. If the strength of the relationship does not satisfy the threshold, the detected pattern may not be useful in categorizing future query phrases. In this example, the detected pattern may not be associated with the category, nor stored in data store 124b for future use. Alternatively or additionally, if a different category exists with which the detected pattern may be associated, code segment 124c may associate the detected pattern with the different category, and store the information in data store 124b, if there is a stronger (and more useful) relationship between the detected pattern and the different category.

Code segment 124c also may be executed at predetermined intervals, or upon the happening of a particular event (e.g., a user request) to update the classification information stored in data store 124b. For example, a new automobile manufacturer may come into the market, such as Renner Automotive. In this example, code segment 124c may be executed to update the classification information within data store 124b to include Renner plus the word "wheels" in the detected pattern of automobile manufacturer plus the word "wheels" because "Renner" is an automobile manufacturer. Furthermore, code segment 124c may be configured to associate the new entry with the automobile category that is associated with the detected pattern. In some implementations, code segment 124c may be configured to associate the word "Renner" with the automobile category and/or definitional information, such as, for example, to indicate that the word "Renner" refers to an automobile manufacturer.

The search system 120 may determine that Renner is an automobile manufacturer in several ways. For example, the search system 120 may be provided with this information directly when a user, for example, indicates that Renner is an automobile manufacturer during a manual update of the classification information. In another example, search system 120 may detect entry of query phrases having, as constituent parts, the word "Renner" and other words or phrases that indicate a relationship between the word "Renner" and an automobile manufacturer (e.g., "car sales," "dealership," and "new car"). In this example, the search system 120 may glean the information that "Renner" is an automobile manufacturer from context clues in other query phrases in the query stream. The search system 120 also includes manual classification process code segment 125 configured to classify a query phrase using a manual query classification technique. More particularly, code segment 125 may be configured to classify a query phrase based on a manually classified query phrase list, such as, for example, a list of query phrases that have previously been classified manually by a human, or third party, editor. For example, the query phrase "BMW wheels" may be classified as belonging to the automobile category because the query phrase "BMW wheels" was previously classified into the automobile category by a human editor. In some implementations, if a constituent part of the query phrase being classified was previously classified into a category by a human editor, the entire query phrase may be associated with the category of the constituent part. For example, if the constituent part "BMW" was previously classified into the automobile category by a human editor, the query phrase "BMW wheels" also may be associated with the automobile category.

The search system 120 also includes supervised machine learning classification process code segment 126 configured to classify a query phrase using a supervised machine learning query classification technique. In general, supervised machine learning involves producing a function, which is modified, refined or learned over time, to transform input data to preferred output data. For example, a process of supervised machine learning may map a feature vector to a set of classes (e.g., categories) based on the learned function. More particularly, code segment 126 may be configured to use distinguishing features to classify a given query phrase into a category. The distinguishing features may be developed by using a seed list of query phrases that have been classified into categories (e.g., a training set) to determine features that relate to the differences between categories and/or query phrases that belong to one category and not another. In other words, the seed list of categories may be used to determine features that distinguish one category from another.

To classify a query phrase, code segment 126 may be configured to access a data store that includes the distinguishing features. For example, code segment 126 may classify the query phrase "BMW wheels" into the automobile category because the query phrase "BMW wheels" includes features that are associated with the automobile category. Query phrases having features that are associated with the automobile category (e.g., features that distinguish query phrases belonging to the automobile category from query phrases belonging to a different category) may include words or phrases that relate to automobiles (e.g., "wheels," "detailing," "trunk," "transmission," "service station," "brakes," and even slang phrases such as "pimp my ride"), as well as proper names of automobile manufacturers (e.g., BMW) or particular automobile models (e.g., 325i). Thus, other query phrases, such as, for example, "BMW detailing," "Renner service station," "transmission service station," and "VW engine," which include one or more of these features, may similarly be classified in the automobile category. The search system 120 also includes classification arbiter code segment 127 configured to determine a category for a query phrase when the query phrase is classified using more than one of the query classification techniques. More particularly, code segment 127 may be configured to determine a category for a query phrase when at least two of the selectional preference, manual and supervised machine learning query classification techniques are used by the search system 120 to determine a category for the query phrase and the query classification techniques disagree on the classification of the query phrase.

In some implementations, code segment 127, when executed, may be configured to classify a query phrase based on a voting scheme. The voting scheme may cause code segment 127 to classify the query phrase into a category determined by a majority of the classification techniques. For example, the selectional preference query classification technique and the supervised machine learning query classification technique may determine a category of automobile for the query phrase "BMW wheels," while the manual query classification technique determines a category of European consumer goods for the query phrase. In this example, code segment 127 may classify the query phrase into the automobile category because a majority of the query classification techniques so classified.

In some implementations, code segment 127, when executed, may be configured to classify a query phrase based on a strength of a classification of the query phrase using a particular query classification technique and an overall classification metric of the particular query classification technique. A query classification technique may classify a query phrase and also provide an indication of strength related to the classification, which indicates the correlation of the query phrase to the classification and thus may be seen as an indicator of the likelihood of error. In addition, each query classification technique may be associated with a general, or overall, classification metric relating to the overall confidence level in the classifications made by the particular query classification technique. Code segment 127 may take into account the particular classification strength for the classification of a particular query phrase and the overall classification metric for the particular query classification technique used. For example, the selectional preference query classification technique may classify the query phrase "BMW wheels" into the automobile category and provide a classification strength of medium. The selectional preference query classification technique may have an overall classification metric of high. The manual query classification technique may classify the query phrase into the European consumer goods category and may provide a classification strength of low with an overall classification metric of low. In this case, code segment 127 may select automobile category for the query phrase because a classification strength of medium plus an overall classification metric of high (for the selectional preference query classification technique) outweighs a classification strength of low with an overall classification metric of low (for the manual query classification technique). As described, the classification strength and overall classification metrics may operate as weights to enable comparison between competing classifications and/or other decision making related to classifications.

Alternatively, code segment 127, when executed, may be configured to classify a query phrase based on a combination of the voting scheme and belief of strength-overall classification metric techniques.

In some implementations, code segment 127 may be configured to associate a query phrase with more than one classification when the query classification techniques disagree on the classification of the query phrase. In the present example, code segment 127, when executed, may classify the query phrase "BMW wheels" into both the automobile category and the European consumer goods category.

Search system 120 also includes query phrase routing process code segment 128 configured to route, or otherwise send, a query phrase to one or more backend databases based on the classification of the query phrase. A backend database is a search resource and may include private databases, websites, bulletin boards, or a backend search engine.

More particularly, code segment 128 may be configured to receive a query phrase and a category associated with a query phrase and determine one or more backend databases related to the received category (e.g., having a category that is the same, or similar, to the category associated with the query phrase) by accessing a data store (not shown) that includes a list of backend databases and associated categories. The determined backend databases may constitute a preferred list of backend databases that is a subset of all available backend databases. In some implementations, code segment 128 may select a further subset of the determined backend databases when, for example, some of the backend databases in the preferred list include redundant information.

Code segment 128 also may be configured to route the query phrase, or a reformatted version of the query phrase, to the determined subset of backend databases in order that the search system 120 may receive search results responsive to the query phrase. For example, code segment 128 may receive the query phrase "BMW wheels" and the associated automobile category. Code segment 128 may route the query phrase to a subset of backend databases that are also associated with the automobile category, such as, for example, a subset of backend databases that includes a Cars Only database. In some cases, code segment 128 may reformat the query phrase before routing it to a particular backend database. Reformatting a query phrase may allow for the subset of backend databases to provide search results that are more responsive to the query phrase because the query phrase has been translated to a form that is best understood by a backend database. For example, if the Cars Only database requests query phrases where the automobile manufacturer is labeled and other constituent parts are added with a plus (+) sign, code segment 128 may reformat the query phrase "BMW wheels" to be "manufacturer=BMW+wheels" before routing it to the Cars Only database. In this way, search system 120 may assist in achieving the best search results for the query phrase (e.g., search results that are most responsive to the information sought by a user who entered the query phrase). Data store 124b, as well as data that may be accessed by any of code segment 124-128, such as the manually classified query phrase list, the supervised machine learning query classification technique distinguishing features, the overall classification metrics, and the backend database-associated category list, may be stored in computer-readable medium and associated with code segment 124-128, respectively. The data may be stored in persistent or non-volatile storage, though this need not necessarily be so. For example, backend database-associated category list may be stored only in memory, such as random access memory, of the search system, because the list may change dynamically as backend databases are added, removed, or changed.

Figure 2:
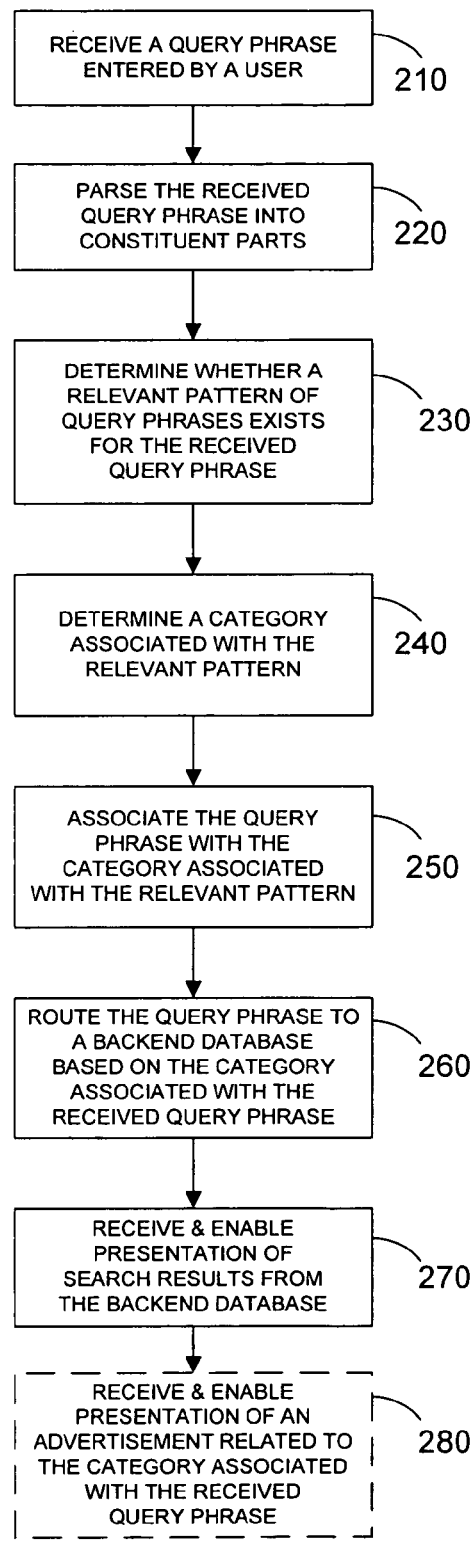
FIG. 2 is a flow chart of a process for performing a search based on classification of a query phrase using a selectional preference query classification technique.

Referring to FIG. 2, an exemplary process 200 performs a search based on classification of a query phrase using a selectional preference query classification technique. Process 200 may be performed by a search system, such as search system 120 of FIG. 1.

Search system 120 receives a query phrase (step 210). The query phrase may be entered by a user seeking information related to the query phrase.

The search system 120 parses the query phrase into constituent parts (step 220). As described above, a query phrase includes constituent parts and a constituent part may be an individual word, a smaller phrase of more than one word within the query phrase or the entire query phrase.

The search system 120 determines whether a relevant pattern of query phrases exists for the query phrase (step 230). The relevant pattern may be stored in classification information and created during the training of the selectional preference query classification technique, as described in detail below. In some implementations, a pattern may be a relevant pattern if the query phrase has a structure that is similar to the pattern. Additionally, or alternatively, a pattern may be a relevant pattern if the query phrase has one or more constituent parts that are the same as, or similar to, a constituent part in the pattern. Constituent parts may be similar if the constituent parts belong to the same category or have other common characteristics, such as, for example, having the same or similar definitional information. Definitional information may include a description of the constituent part. For example, the word "Ford" may have definitional information indicating that the word "Ford" relates to an automobile manufacturer.

The search system 120 determines a category associated with the relevant pattern (step 240). In some implementations, the relevant pattern may be associated with more than one category. For example, the pattern of automobile manufacturer plus the word "wheels" may be associated with an automobile category and a consumer goods category. The search system 120 associates the query phrase with the category associated with the relevant pattern (step 250). In implementations where the pattern is associated with more than one category, the search system 120 may associate the query phrase with all, a subset, or a single one of the multiple categories associated with the relevant pattern.

The search system 120 routes the query phrase to a backend database based on the category associated with the query phrase (step 260). More particularly, the search system 120 may access a list of categories and related backend databases. The search system 120 may compare the category (or categories) associated with the query phrase to the categories in the list and identify backend databases that correspond to the matching categories. The search system 120 may route, or otherwise send, the query phrase to all, or a subset, of the identified backend databases. As described previously, a reformatted version of a query phrase may be sent to the identified backend databases instead of, or in addition to, the original query phrase in order to receive more responsive search results from the backend databases.

In some implementations, the query phrase may be sent to more than one backend database (e.g., a subset of all backend databases or a subset of a preferred list of backend databases) if more than one backend database is associated with a category that is the same as, or similar to, the category associated with the query phrase. Furthermore, the query phrase may be sent to more than one backend database if the query phrase is associated with more than one category.

The search system 120 receives search results from the backend database and enables presentation of the search results to the user (step 270). If the query phrase is sent to more than one backend database, the search system 120 may receive search results from each of the backend databases to which the query phrase (or a reformatted version of the query phrase) was sent.

In some implementations, the presentation of the search results may be altered based on the category related to the query phrase and backend database from which the search results are received. For example, a map may be presented in response to a geographic query phrase and/or an extracted list of comparison prices may be presented in response to a shopping query phrase. Search results received from an appropriate backend database, and optionally altered based on the classification of the query phrase, may be more responsive to a particular query phrase entered by a user seeking information related to the particular query phrase.

In the manner described, a large portion of a general query stream (e.g., a stream of query phrases being entered by users and received by a search system) may be classified. Classification of the general query stream as a whole may allow tracking of trends over time. A search system may use trend tracking data as a mechanism for identifying areas that may require additional resources (e.g. additional hardware or new backend databases).

The search system 120 may optionally determine an advertisement related to the category associated with the query phrase and enable presentation of the advertisement to the user (step 280). If the query phrase is associated with more than one category, an advertisement related to one or more of the categories associated with the query phrase may be determined and presented to the user.

Figure 3:
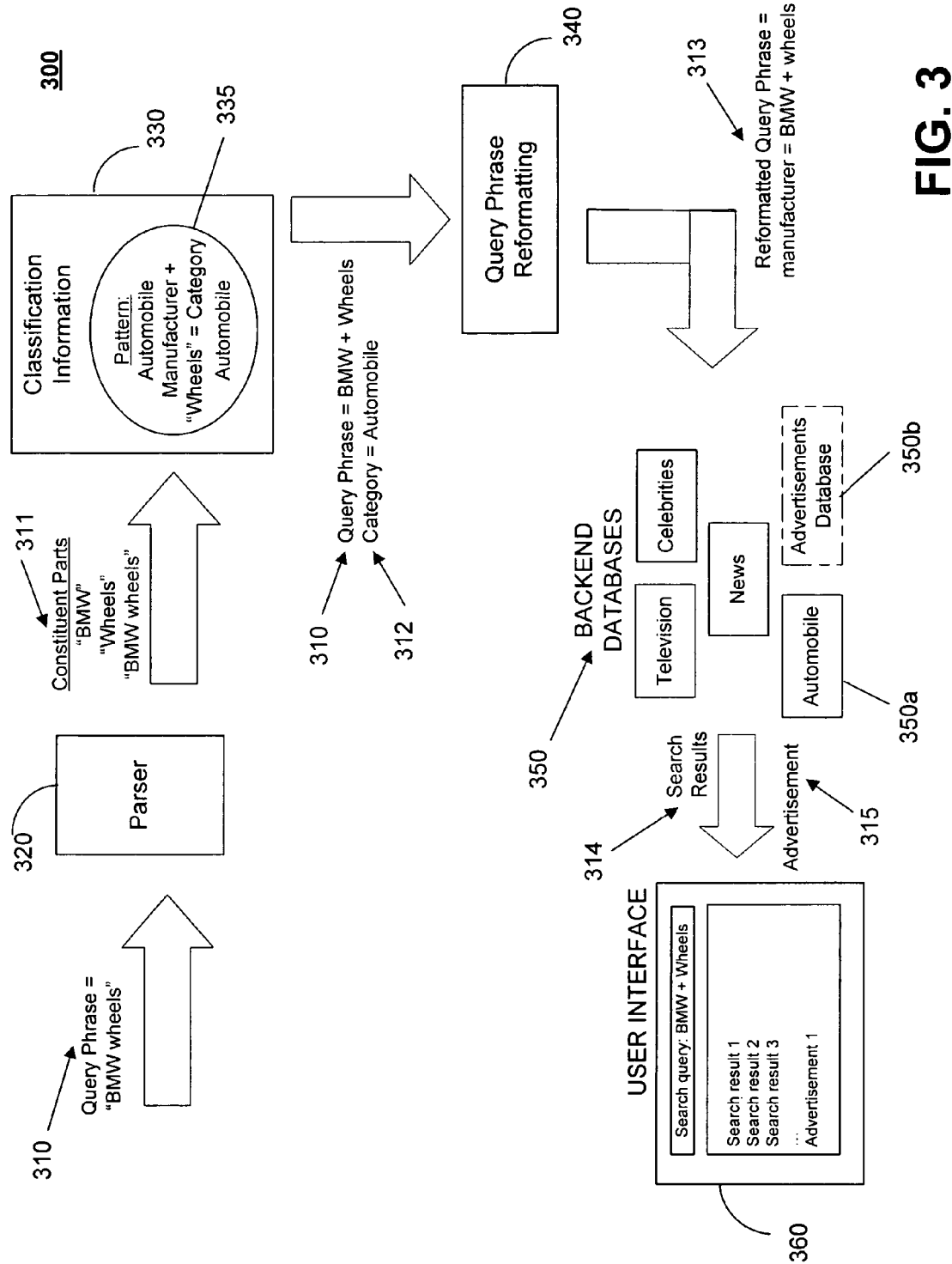
FIG. 3 is a block diagram illustrating an example of performing a search based on classification of a query phrase using a selectional preference query classification technique.

Referring to FIG. 3, a process 300 illustrates an example of performing a search based on classification of a query phrase using a selectional preference query classification technique. Block diagram 300 includes, inter alia, query phrase 310, parser 320, classification information 330 including pattern 335, query phrase reformatting unit 340, backend databases 350 and user interface 360.

More particularly, query phrase 310 relates to the query phrase "BMW wheels." Query phrase 310 may be entered by a user via a user interface (not shown). Query phrase 310 may be sent to parser 320. Parser 320 may break down the query phrase 310 into its constituent parts. For example, query phrase 310 may be broken down into constituent parts 311, such as "BMW," "wheels" and "BMW wheels."

The constituent parts may be compared with classification information 330 to determine if a relevant pattern exists for query phrase 310. Classification information 330 includes pattern 335. Pattern 335 includes the pattern of automobile manufacturer plus the word "wheels" (abbreviated in the figure as "automobile maker+wheels"). Query phrase 310 may be deemed similar to pattern 335 because query phrase 310 has at least one constituent part in common with pattern 335. Additionally, or alternatively, query phrase 310 also may be deemed similar to pattern 335 because query phrase 310 includes an automobile manufacturer (e.g., BMW) and the word "wheels." In other words, query phrase 310 fits within pattern 335. Pattern 335, therefore, is a relevant pattern for query phrase 310 and may be used to classify query phrase 310 into a category associated with the pattern 335. Here, pattern 335 is associated with the automobile category, and thus, query phrase 310 also may be associated with the automobile category.

Based on the classification of query phrase 310 into the automobile category 312, the query phrase 310 may be reformatted by query phrase reformatting unit 340. For example, a category of automobile 312 may indicate that backend databases related to automobiles are most appropriate to be searched for the query phrase 310. Furthermore, the automobile category 312 also may indicate that it is desirable to send a reformatted query phrase to the automobile backend databases. For example, backend databases related to automobiles may return better results if an automobile manufacturer in the query phrase is labeled and additional words are appended with a plus (+) symbol. Thus, query phrase reformatting unit 340 may reformat query phrase 310 into reformatted query phrase 312 "manufacturer=BMW+wheels."

Category automobile 312 and reformatted query phrase 313 may be sent to backend databases 350. In some implementations, original query phrase 310 may be sent to backend databases 350 in addition to reformatted query phrase 313. In the configuration where it may not be helpful to send a reformatted query phrase to a backend database, the original query phrase 310 may be sent instead of reformatted query phrase 313.

Backend databases 350 include several backend databases related to particular categories. For example, backend database 350a is related to an automobile category. Backend databases 350 also include advertisements database 350b, which includes advertisements related to particular categories. In some implementations, advertisements database 350b may include particular sub-databases having advertisements related to particular categories. For example, there may be an automobile advertisements database that includes advertisements related to the automobile category.

Each of backend databases 350, such as backend database 350a, may include more than one backend database related to automobiles, for example, such that backend database 350a includes a subset (e.g., a preferred list) of all available backend databases that are associated with automobiles. Furthermore, each of backend databases 350 also may include websites, search engines, and other search resources within the subset of backend databases.

Reformatted query phrase 313 may be sent to backend databases that have a category that is the same as, or similar to, the category associated with the query phrase 313 (and reformatted query phrase 313). In this example, reformatted query phrase 313 is sent to backend database 350a, the automobiles backend database. Backend database 350a may be searched for search results that are responsive to the reformatted query phrase 313. In addition, advertisements database 350b also may be searched for advertisements related to the automobiles category.

Search results 314 may be received from automobiles backend database 350a and advertisement 315 may be received from advertisements database 350b. Search results 314 and advertisement 315 may be presented to the user who entered the query phrase 310 by displaying the query phrase 310, search results 314 and advertisement 315 in a user interface, such as user interface 360. In some implementations, user interface 360 may display the reformatted query phrase 313 in addition to, or instead of, original query phrase 310.

Figure 4:
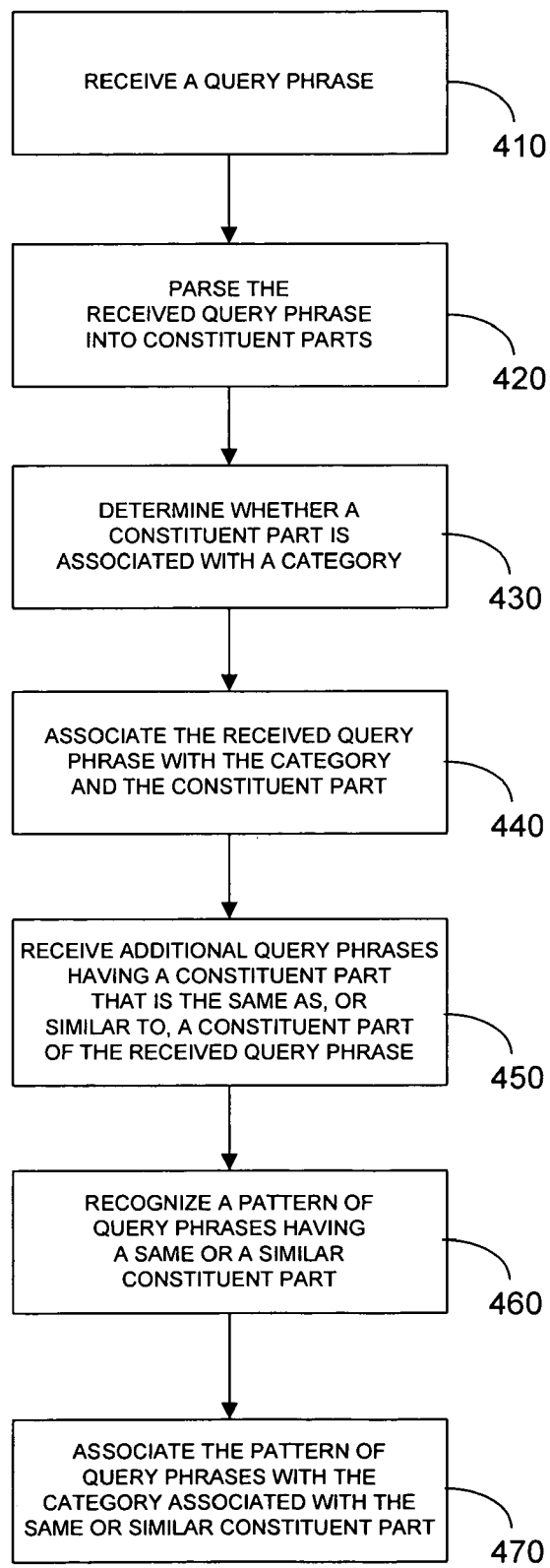
FIG. 4 is a flow chart of a process for training a selectional preference query classification technique.

Referring to FIG. 4, an exemplary process 400 trains a selectional preference query classification technique. Process 400 may be performed by a search system, such as search system 120 of FIG. 1.

The search system 120 receives a query phrase (step 410). The query phrase may be one of many query phrases in a set of query phrases received from a general query stream and stored to be used to train the selectional preference query classification technique.

The search system parses the query phrase into constituent parts (step 420). The search system determines whether a constituent part is associated with a category (step 430). To do so, the search system may access a data store that includes constituent parts (e.g., words or phrases that make up larger query phrases) and associated categories. For example, the data store may include the constituent part "BMW" and one or more associated categories, such as "automobile," "European" and "consumer products." If a category has been associated with the constituent part, the search system 120 may associate the query phrase with the constituent part and the category associated with the constituent part (step 440). In some implementations, the query phrase also may be associated with the constituent part.

The search system 120 receives additional query phrases having a constituent part that is the same as, or similar to, a constituent part of the received query phrase (step 450). The additional query phrases also may be received from a set of query phrases received from the general query stream and stored. The search system 120 recognizes a pattern of query phrases having a same, or a similar, constituent part (step 460). A constituent part may be similar to another constituent part if the constituent parts belong to the same (or a similar) category or have the same definitional information.

Based on the recognized pattern, the search system 120 associates the pattern of query phrases with the category associated with the common constituent part (step 470).

The pattern and associated category may be used by the selectional preference query classification technique to classify later received query phrases, as described above.

Figure 5:
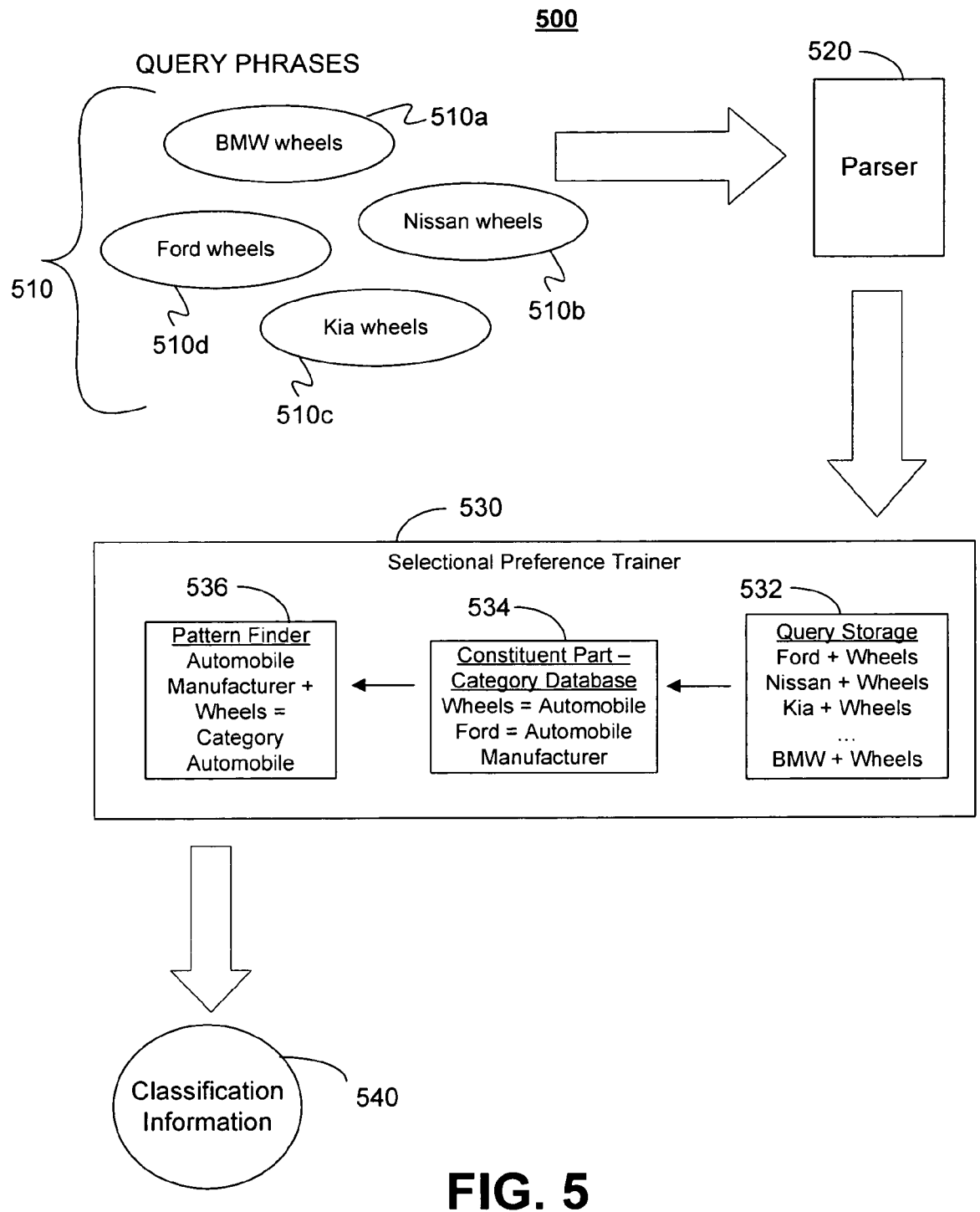
FIG. 5 is a block diagram illustrating an example of training a selectional preference query classification technique for a particular pattern.

Referring to FIG. 5, a process 500 illustrates an example of training a selectional preference query classification technique for a particular pattern. Block diagram 500 includes query phrases 510, parser 520, selectional preference trainer 530 and classification information 540.

More particularly, query phrases 510 includes query phrases 510a "BMW wheels," 510b "Nissan wheels," 510c "Kia wheels" and 510d "Ford wheels." Thus, each of query phrases 510a-510d includes an automobile manufacturer plus the word "wheels."

Each query phrase may be parsed into its constituent parts by parser 520 in a manner similar to that described with respect to parser 320 of FIG. 3. For example, query phrase 510a may be parsed into constituent phrases "BMW," "wheels," and "BMW wheels."

The constituent parts for a particular query phrase may be provided to selectional preference trainer 530. Selectional preference trainer 530 includes query storage 532, constituent part-category database 534 and pattern finder 536. Query storage 532 may be configured to store query phrases that have been, or will be, used to detect a pattern. For example, query storage 532 includes the query phrases 510b, 510c, 510d and newly added query phrase 510a BMW wheels.

Constituent part-category database 534 may be configured to store an association between a particular constituent part and a category to which the particular constituent part belongs. For example, the constituent part "wheels" belongs to the automobile category. In some implementations, constituent part-category database 534 also may store information related to a constituent part that is not necessarily a category, such as, for example, definitional information for the constituent part. Additionally, or alternatively, constituent part-category database may include category and/or definitional information for a particular constituent part.

Pattern finder 536 may be configured to detect patterns among a series of query phrases. For example, pattern finder 536 may detect a pattern among query phrases 510a-510d. More particularly, pattern finder 536 may detect a pattern of the form "automobile manufacturer+wheels" among query phrases 510a-510d. The pattern may be detected because query phrases 510a-510d have a constituent part in common (e.g., the word "wheels") and also include a similar constituent part (e.g., definitional information indicating that the constituent part relates to an automobile manufacturer). However, one of these similarities between query phrases 510a-510d may be enough for a pattern to be detected by pattern finder 536.

Pattern finder 536 also may associate the detected pattern with a category. The category may be chosen based on a category of one or more of the constituent parts related to the detected pattern. In some implementations, pattern finder 536 may associate a pattern with all, or a subset of all, the categories associated with any query phrases that fit within the pattern. Additionally, pattern finder 536 also may associate a pattern and related category with particular constituent parts and definitional information. This information may be used to determine if a particular query phrase falls within the pattern and thus, may be associated with one or more of the categories associated with the pattern.

The detected pattern and related information may be stored in classification information 540. Classification information 540 may be used by the selectional preference query classification technique to determine if a relevant pattern exists for a particular query phrase. If so, classification information 540 may provide one or more categories associated with the relevant pattern to be associated with the query phrase. The query phrase may be routed to one or more appropriate backend databases based on the category provided by classification information 540 in order to receive search results that are the most responsive to a user-entered query phrase.

Figure 6:
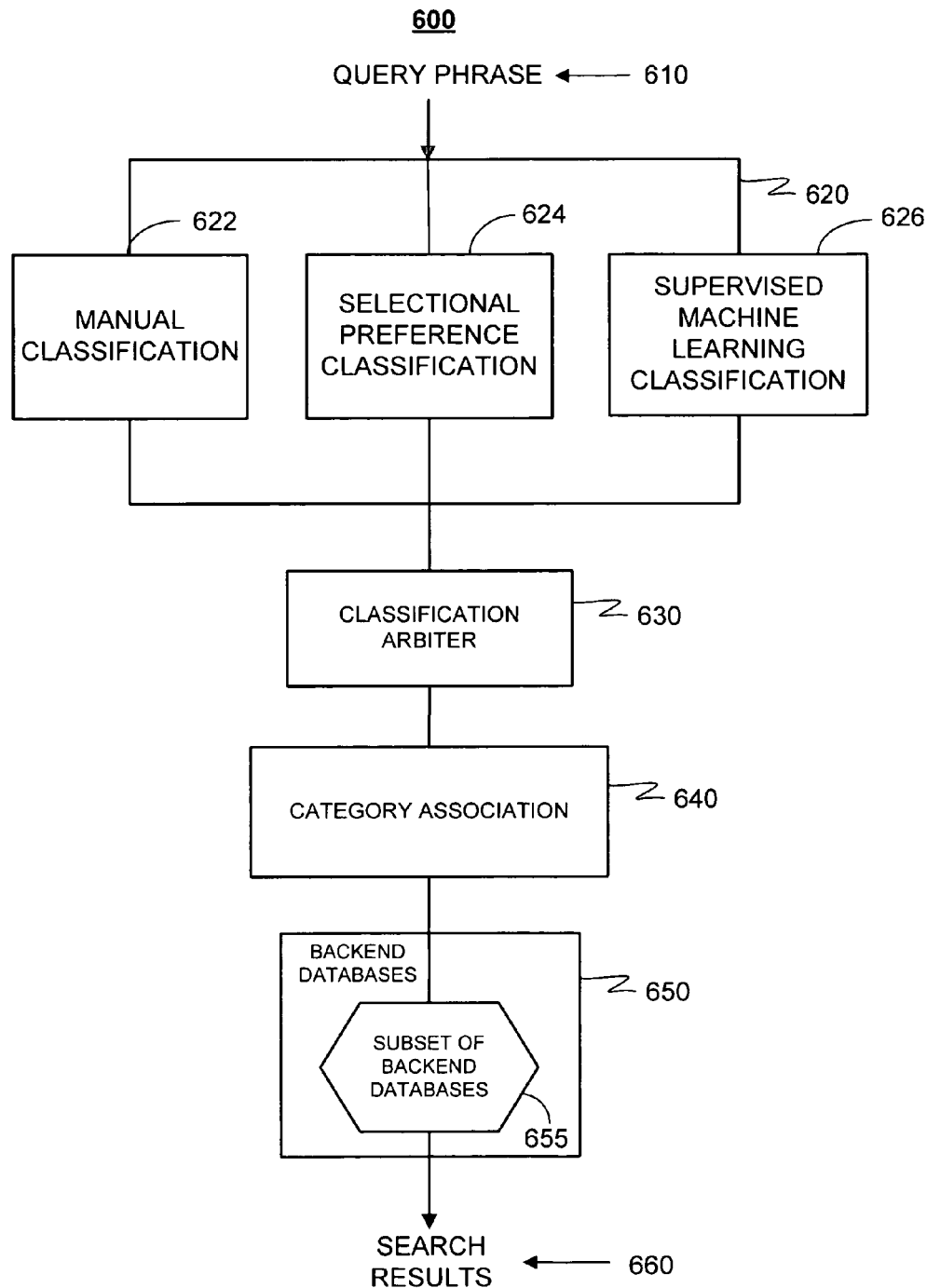
FIG. 6 is a block diagram illustrating an example of performing a search for a query phrase based on a classification of the query phrase using a combination of query classification techniques.

Referring to FIG. 6, a process 600 illustrates an example of performing a search for a query phrase based on a classification of the query phrase using a combination of query classification techniques. More particularly, the query phrase may be associated with one or more categories based on a combination of query classification techniques. Search results responsive to the query phrase may be received by searching for the query phrase in backend databases that are related to a category associated with the query phrase. Block diagram 600 includes query phrase 610, query classification techniques 622, 624 and 626, classification arbiter 630, category association unit 640, databases 650 and query search results 660.

Query phrase 610 may be entered by a user seeking information related to the query phrase. For example, a user may enter the query phrase "BMW wheels" to find information related to wheels for a car made by automobile manufacturer BMW.

Query phrase 610 may be associated with a category by query classification techniques 620. More particularly, a manual query classification technique 622, a selectional preference query classification technique 624 and a supervised machine learning query classification technique 626 may each determine a category to be associated with query phrase 610.

Manual query classification technique 622 may determine a category for query phrase 610 based on a manually classified query phrase list, such as, for example, a list of query phrases that were previously classified by a human editor). For example, the query phrase "BMW wheels" may be determined to belong to a category related to European consumer goods because the query phrase "BMW wheels," or a constituent part of the query phrase, such as, for example, "BMW," was previously manually classified into the European consumer goods category by a human editor.

Selectional preference query classification technique may determine a category for query phrase 610 in a manner similar to that described with respect to process 200 of FIG. 2. More particularly, if a relevant pattern exists for query phrase 610, a category (or several categories) associated with the relevant pattern may be determined for query phrase 610. For example, a pattern for automobile manufacturer plus the word "wheels" may be a relevant pattern for the query phrase "BMW wheels." Thus, because the relevant pattern may be associated with an automobile category, the category automobile may be determined for the query phrase.

Supervised machine learning query classification technique 626 also may determine a category for query phrase 610. More particularly, supervised machine learning query classification technique may use distinguishing features to classify a given query phrase into a category. The distinguishing features may be developed by using a seed list of query phrases that have been classified into categories (e.g., a training set) to determine features that relate to the differences between categories and/or query phrases that belong to a particular category. In other words, the seed list of categories may be used to determine features that distinguish one category from another. For example, code segment 126 may classify the query phrase "BMW wheels" into the automobile category because the query phrase "BMW wheels" includes features that are associated with the automobile category, as described above with respect to FIG. 2.

There may be situations where one or more of query classification techniques 622, 624 and 626 may disagree on the classification of the query phrase. Classification arbiter 630 may select among the possible categories determined by the query classification techniques 620 when the query classification techniques disagree on the classification of query phrase 610. Alternatively, classification arbiter 630 may select more than one classification for query phrase 610 when the query classification techniques are inconsistent, and thus, determine more than one classification for query phrase 610. In the present example, selectional preference query classification technique 624 and supervised machine learning query classification technique 626 may determine a category of automobile for query phrase 610, while manual query classification technique 622 may determine a category of European consumer goods for query phrase 610.

Many techniques may be used by classification arbiter 630 as described above with respect to FIG. 2. In the present example, based on the voting scheme technique, the classification arbiter 630 may select the automobile category for query phrase 610 because two of the three query classification techniques determined the automobile category for the query phrase 610. The same result may arise when the classification arbiter 630 is configured based on the classification strength-overall classification metric technique. In this case, the classification arbiter 630 may select the automobile category for query phrase 610 because a classification strength of medium plus an overall classification metric of high (for the selectional preference query classification technique) outweighs a classification strength of low with an overall classification metric of low (for the manual query classification technique). The classification arbiter 630, when configured to classify query phrase 610 based on a combination of these two techniques, also may select the automobile category for query phrase 610. Alternatively, the classification arbiter 630 may classify query phrase 610 into both the automobile and European consumer goods categories.

The category (or categories) determined by classification arbiter 630 (or query classification techniques 622, 624 and 626 if no disagreement as to the classification is present) may be associated with query phrase 610 by category association unit 640. For example, category association unit 640 may associate the category automobile with the query phrase "BMW wheels."

In some implementations, the association between the query phrase 610 and the automobile category also may be stored and provided to a selectional preference training module, such as selectional preference trainer 530 of FIG. 5. The query phrase and associated category may be used (immediately or in the future) to update the classification information and improve the classifications performed by the selectional preference query classification technique or the other query classification techniques.

Query phrase 610 may be routed to backend databases 650 to determine search results for query phrase 610. More particularly, query phrase 610 may be routed, or otherwise sent, to a subset of backend databases 655 based on the category associated with the query phrase. The subset of backend databases 655 include backend databases having at least one category in common with query phrase 610. For example, query phrase 610, being associated with the automobile category, may be routed to a Cars Only database, where the Cars Only database has a category of automobile. In another example, if query phrase 610 is associated with both the automobile and European consumer goods categories, the subset of backend databases 655 may include backend databases having a category of automobile (e.g., the Cars Only database), backend databases having a category of European consumer goods (e.g., a Buy Europe database), and backend databases having both categories (e.g., a New European Cars).

Search results 660 may be received from the subset of backend databases 655. The search results are responsive to query phrase 610. Search results may include websites having information related to query phrase 610, advertisements and websites selling products related to query phrase 610, and web logs, news feeds, or bulletin boards including information responsive to query phrase 610. For example, search results 660 may include a website that is selling wheels for cars made by BMW direct from the manufacturer. The search results 660 may be presented to the user who entered query phrase 610.

In some implementations, the presentation of the search results may be altered based on the category related to the query phrase and backend database from which the search results are received. For example, a map may be presented in response to a geographic query phrase and/or an extracted list of comparison prices may be presented in response to a shopping query phrase. Search results received from an appropriate backend database, and optionally altered based on the classification of the query phrase, may be more responsive to a particular query phrase entered by a user seeking information related to the particular query phrase.

In some implementations, a category that has been associated with a query phrase by search system 120 may be presented to a user. The category may be presented to the user at the same time as, or prior to, presentation and display of the search results. The search system 120 may be configured to receive input from the user as to the classification of the user's query phrase into a category in order to positively affect which backend databases the query phrase may be routed to and, ultimately, the search results provided for the query phrase. In some implementations, the search system 120 may be configured to allow a user to provide a category for the query phrase at the same time the user enters the query phrase. Alternatively, or additionally, the user may provide input before or after the category and/or search results are displayed to the user. If the user provides input before search results are displayed, the search system 120 may take the user's input into account when routing the query phrase to one or more backend databases. If the input is provided by the user after search results are displayed, the search system 120 may re-route the query phrase to the backend databases and return search results that are more responsive to the user's request.

In one example, a user may enter the query phrase "eagles." The search system 120 may determine that two categories, such as, for example, football and birds, are associated with the query phrase. However, in many cases, the user is interested in one of these categories, but probably not both. Thus, if the search system 120 routes the query phrase "eagles" to backend databases having categories related to both football and birds, half of the search results retrieved and displayed to the user may not be responsive to the user's request.

In some implementations, the search system 120 may make an educated guess as to which category is responsive to the user's request and route the query phrase accordingly. In the present example, the search system 120 may guess that the user is interested in information about birds and not a football team. The search system 120 may provide the user with both the guessed category (e.g., birds) and the rejected category (e.g., football) and enable the user to indicate that the search system 120 guessed incorrectly (e.g., the user is interested in the football team, not birds). Upon indicating that the search system 120 guessed incorrectly, the user may provide a correct category for the query phrase. The user may provide the correct category by selecting from one of the other categories presented (e.g., the rejected category) or inputting a different category. Based on the newly received category information, the search system 120 may re-route the query phrase and provide new search results accordingly.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method, performed at least partially on a computer, for enabling satisfaction of a search responsive to a query based on classification of the query, the method comprising:

receiving, from user input, a query phrase;

parsing the received query phrase into at least a first constituent part and a second constituent part;

determining definitional information of the first constituent part;

determining a first category associated with the received query phrase by performing a first classification process that uses the determined definitional information of the first constituent part and the second constituent part, the first classification process including:

accessing, from classification information stored in a computer storage medium that includes patterns, a pattern that is associated with at least one category, the pattern including a first part and a second part;

comparing the determined definitional information of the first constituent part with the first part included in the accessed pattern and comparing the second constituent part with the second part included in the accessed pattern;

based on the comparison results, determining whether the second constituent part and the determined definitional information of the first constituent part correspond to at least a subportion of the accessed pattern;

based on a determination that the second constituent part and the determined definitional information of the first constituent part correspond to at least a subportion of the accessed pattern, identifying the category that is associated with the pattern as the first category associated with the received query phrase;

determining a second category associated with the received query phrase by performing a second classification process that uses the determined definitional information of the first constituent part and the second constituent part, the second classification process being different than the first classification process;

determining whether the first category determined by the first classification process matches the second category determined by the second classification process;

in response to a determination that the first category matches the second category, associating the received query phrase with a category that corresponds to the first category and the second category;

in response to a determination that the first category does not match the second category:

selecting, from among the first category and the second category, a single category; and associating the received query phrase with the single category selected;

identifying at least one search resource for satisfying the received query phrase based on the associated category; and routing the received query phrase to the at least one identified search resource.

2. The method of claim 1 wherein associating the category includes associating more than one category.

3. The method of claim 1 further comprising:

receiving, based on the received query phrase, at least one search result from the at least one identified search resource; and presenting the at least one search result to the user.

4. The method of claim 1 further comprising:

comparing the category associated with the received query phrase with attributes associated with search resources; and wherein the routing includes modifying the received query phrase and routing a modified version of the received query phrase to a subset of the search resources based on a result of the comparison of the category with the attributes.

5. The method of claim 4 wherein modifying the received query phrase includes at least one of adding words to the received query phrase, eliminating words from the received query phrase, and re-ordering words in the received query phrase.

6. The method of claim 1 further comprising:

determining an advertisement associated with at least one of the categories associated with the received query phrase; and presenting the advertisement to the user.

7. The method of claim 1 further comprising training a selectional preference query classification technique, wherein the training comprises:

receiving a training query phrase including constituent parts;

parsing the training query phrase into at least a third constituent part and a fourth constituent part;

determining definitional information of at least the third constituent part;

receiving additional training query phrases having constituent parts in common with the training query phrase, the constituent parts in common with the training query phrase including a constituent part that matches the fourth constituent part and a constituent part that is different than the third constituent part, but has definitional information that matches the determined definitional information of the third constituent part;

recognizing a pattern of training query phrases having constituent parts in common with the training query phrase;

determining a category associated with the common constituent parts;

associating the pattern of training query phrases with the determined category; and using the pattern and the associated category to classify query phrases, the pattern including the determined definitional information of the third constituent part, and the fourth constituent part.

8. The method of claim 7 wherein a constituent part includes at least one of an individual word, a subportion of the training query phrase, and the entire training query phrase.

9. The method of claim 1 further comprising classifying the received query phrase using at least one of a manual query classification technique and a supervised machine learning query classification technique.

10. The method of claim 9 further comprising:
comparing the results of the query classification technique with the associated category; and
conditioned on the comparison indicating inconsistent results:
determining a category for the received query phrase using a classification arbiter; and
associating the category determined by the classification arbiter with the received query phrase.

11. The method of claim 9 further comprising:
determining a category for the received query phrase using more than two query classification techniques; and
classifying the received query phrase using the classification arbiter and based on the classification determined by a majority of the query classification techniques.

12. The method of claim 10 wherein the classification arbiter determines the classification of the received query phrase based on a confidence in the classification of the received query phrase that resulted from using a query classification technique and an overall classification metric of the query classification technique.

13. The method of claim 10 further comprising:
determining a category for the received query phrase using more than two query classification techniques; and
classifying the received query phrase using the classification arbiter and based on both the classification determined by a majority of the query classification techniques and a determination of the classification based on a confidence in the classification of the received query phrase that resulted from using a query classification technique and the overall classification metric of the query classification technique.

14. The method of claim 9 wherein the manual query classification technique is used as a seed for the selectional preference and supervised machine learning query classification techniques.

15. The method of claim 1 wherein:
determining definitional information of the first constituent part comprises determining a description of the first constituent part;
the first part of the accessed pattern comprises a description; and
comparing the determined definitional information of the first constituent part with the first part of the accessed pattern comprises comparing the determined description of the first constituent part with the description included in the accessed pattern.

16. The method of claim 1 wherein:
determining definitional information of the first constituent part comprises determining a type of the first constituent part;
the first part of the accessed pattern comprises a type; and
comparing the determined definitional information of the first constituent part with the first part of the accessed pattern comprises comparing the determined type of the first constituent part with the type included in the accessed pattern.

17. The method of claim 1 wherein determining whether the second constituent part and the determined definitional information of the first constituent part correspond to at least a subportion of the accessed pattern comprises determining whether the second constituent part corresponds to the second part of the accessed pattern and determining whether the determined definitional information of the first constituent part corresponds to the first part of the accessed pattern.

18. An apparatus for enabling satisfaction of a search responsive to a query based on classification of the query, the apparatus comprising:
at least one processor; and
at least one computer-readable medium coupled to the at least one processor having instructions stored thereon which, when executed by the at least one processor, causes the at least one processor to:
receive, from user input, a query phrase;
parse the received query phrase into at least a first constituent part and a second constituent part;
determine definitional information of the first constituent part;
determine a first category associated with the received query phrase by performing a first classification process that uses the determined definitional information of the first constituent part and the second constituent part, the first classification process including:
accessing, from classification information stored in a computer storage medium that includes patterns, a pattern that is associated with at least one category, the pattern including a first part and a second part;
comparing the determined definitional information of the first constituent part with the first part included in the accessed pattern and comparing the second constituent part with the second part included in the accessed pattern;
based on the comparison results, determining whether the second constituent part and the determined definitional information of the first constituent part correspond to at least a subportion of the accessed pattern;
based on a determination that the second constituent part and the determined definitional information of the first constituent part correspond to at least a subportion of the accessed pattern, identifying the category that is associated with the pattern as the first category associated with the received query phrase;
determine a second category associated with the received query phrase by performing a second classification process that uses the determined definitional information of the first constituent part and the second constituent part, the second classification process being different than the first classification process;
determine whether the first category determined by the first classification process matches the second category determined by the second classification process;
in response to a determination that the first category matches the second category, associate the received query phrase with a category that corresponds to the first category and the second category;
in response to a determination that the first category does not match the second category:
select, from among the first category and the second category, a single category; and
associate the received query phrase with the single category selected;
identify at least one search resource for satisfying the received query phrase based on the associated category; and
route the received query phrase to the at least one identified search resource.

19. The apparatus of claim 18 wherein the at least one computer-readable medium has instructions stored thereon which, when executed by the at least one processor, causes the at least one processor to:
receive, based on the query phrase, at least one search result from the at least one identified search resource;
determine an advertisement associated with at least one of the categories associated with the query phrase; and
present the at least one search result and the advertisement to the user.

20. The apparatus of claim 18 wherein the at least one computer-readable medium has instructions stored thereon which, when executed by the at least one processor, causes the at least one processor to train a selectional preference query classification technique.

21. The apparatus of claim 18 wherein the at least one computer-readable medium has instructions stored thereon which, when executed by the at least one processor, causes the at least one processor to:
receive a training query phrase including constituent parts;
parse the training query phrase into at least a third constituent part and a fourth constituent part;
determine definitional information of at least the third constituent part;
receive additional training query phrases having constituent parts in common with the training query phrase, the constituent parts in common with the training query phrase including a constituent part that matches the fourth constituent part and a constituent part that is different than the third constituent part, but has definitional information that matches the determined definitional information of the third constituent part;
recognize a pattern of training query phrases having constituent parts in common with the training query phrase;
determine a category associated with the common constituent parts;
associate the pattern of training query phrases with the determined category; and
use the pattern and the associated category to classify query phrases, the pattern including the determined definitional information of the third constituent part, and the fourth constituent part.

22. The apparatus of claim 18 wherein the at least one computer-readable medium has instructions stored thereon which, when executed by the at least one processor, causes the at least one processor to:
classify the received query phrase using at least one of a manual query classification technique and a supervised machine learning query classification technique;
compare the results of the query classification technique with the associated category; and
conditioned on the comparison indicating inconsistent results:
determine a category for the received query phrase using a classification arbiter; and
associating the category determined by the classification arbiter with the received query phrase.

23. An apparatus for enabling satisfaction of a search responsive to a query based on classification of the query, the apparatus comprising:
means for receiving, from user input, a query phrase;
means for parsing the received query phrase into at least a first constituent part and a second constituent part;
means for determining definitional information of the first constituent part;
means for determining a first category associated with the received query phrase by performing a first classification process that uses the determined definitional information of the first constituent part and the second constituent part, the first classification process including:
accessing, from classification information stored in a computer storage medium that includes patterns, a pattern that is associated with at least one category, the pattern including a first part and a second part;
comparing the determined definitional information of the first constituent part with the first part included in the accessed pattern and comparing the second constituent part with the second part included in the accessed pattern;
determining, based on the comparison results, whether the second constituent part and the determined definitional information of the first constituent part correspond to at least a subportion of the accessed pattern;
based on a determination that the second constituent part and the determined definitional information of the first constituent part correspond to at least a subportion of the accessed pattern, identifying the category that is associated with the pattern as the first category associated with the received query phrase;
means for determining a second category associated with the received query phrase by performing a second classification process that uses the determined definitional information of the first constituent part and the second constituent part, the second classification process being different than the first classification process;
means for determining whether the first category determined by the first classification process matches the second category determined by the second classification process;
means for, in response to a determination that the first category matches the second category, associating the received query phrase with a category that corresponds to the first category and the second category;
means for, in response to a determination that the first category does not match the second category:
selecting, from among the first category and the second category, a single category; and
associating the received query phrase with the single category selected;
means for associating the category that is associated with the pattern also with the received query phrase based on a determination that the second constituent part and the determined definitional information of the first constituent part correspond to at least the subportion of the accessed pattern;
means for identifying at least one search resource for satisfying the received query phrase based on the associated category; and
means for routing the received query phrase to the at least one identified search resource.

24. The apparatus of claim 23 further comprising:
receiving, based on the received query phrase, a search result from the at least one identified search resource;
determining an advertisement associated with at least one of the categories associated with the received query phrase; and
presenting the at least one search result and the advertisement to the user.

25. The apparatus of claim 23 further comprising training a selectional preference query classification technique, wherein the training comprises:
receiving a training query phrase including constituent parts;

parsing the training query phrase into at least a third constituent part and a fourth constituent part;

determining definitional information of at least the third constituent part;

receiving additional training query phrases having constituent parts in common with the training query phrase, the constituent parts in common with the training query phrase including a constituent part that matches the fourth constituent part and a constituent part that is different than the third constituent part, but has definitional information that matches the determined definitional information of the third constituent part;

recognizing a pattern of training query phrases having constituent parts in common with the training query phrase;

determining a category associated with common constituent parts;

associating the pattern of training query phrases with the determined category; and using the pattern and the associated category to classify query phrases, the pattern including the determined definitional information of the third constituent part, and the fourth constituent part.

26. The apparatus of claim 23 further comprising classifying the received query phrase using at least one of a manual query classification technique and a supervised machine learning query classification technique.

27. The apparatus of claim 26 further comprising:

comparing the results of the query classification technique with the associated category; and conditioned on the comparison indicating inconsistent results:

determining a category for the received query phrase using a classification arbiter; and associating the category determined by the classification arbiter with the received query phrase.

* * * * *